(12) United States Patent
Braghiroli

(10) Patent No.: US 7,746,456 B2
(45) Date of Patent: Jun. 29, 2010

(54) APPARATUS FOR CONTACTLESS 3D WHEEL ALIGNMENT, SYSTEM AND METHOD THEREFOR

(75) Inventor: Francesco Braghiroli, Reggio Emilia (IT)

(73) Assignee: Snap-On Equipment SRL a Unico Socio, Correggio (IT)

( * ) Notice: Subject to any disclaimer, the term of this patent is extended or adjusted under 35 U.S.C. 154(b) by 513 days.

(21) Appl. No.: 11/733,629

(22) Filed: Apr. 10, 2007

(65) Prior Publication Data

US 2008/0037012 A1   Feb. 14, 2008

(30) Foreign Application Priority Data

Apr. 10, 2006   (EP) ................................ 06007521

(51) Int. Cl.
*G01B 11/26* (2006.01)
(52) U.S. Cl. .................. 356/155; 356/139.09
(58) Field of Classification Search .......... 33/288, 33/203.18; 356/155, 139.09
See application file for complete search history.

(56) References Cited

U.S. PATENT DOCUMENTS

| | | | |
|---|---|---|---|
| 4,863,266 A * | 9/1989 | Masuko et al. ......... | 356/139.09 |
| 5,608,910 A | 3/1997 | Shimakura | |
| 6,400,451 B1 * | 6/2002 | Fukuda et al. ......... | 356/139.09 |
| 6,657,711 B1 | 12/2003 | Kitagawa et al. ............ | 356/155 |
| 6,862,544 B1 | 3/2005 | Merrill ........................ | 702/95 |

FOREIGN PATENT DOCUMENTS

| | | |
|---|---|---|
| DE | 102 44 975 A1 | 4/2004 |
| EP | 0 581 990 A1 | 2/1994 |
| EP | 0 766 064 A2 | 4/1997 |
| EP | 1 174 698 A2 | 1/2002 |
| GB | 2 403 042 | 12/2004 |
| JP | 09329433 | 12/1997 |
| WO | WO 00/26767 | 5/2000 |
| WO | WO 2005/008172 | 1/2005 |
| WO | WO 2006/035368 A1 | 4/2006 |

* cited by examiner

*Primary Examiner*—L. G Lauchman
(74) *Attorney, Agent, or Firm*—McDermott Will & Emery LLP

(57) ABSTRACT

An alignment measuring apparatus for 3D contactless measuring alignment of a wheel of an automotive vehicle, a system formed by several apparatuses for a total wheel alignment of all wheels of an automotive vehicle, and a respective method for carrying out 3D contactless wheel alignment in real time. The several embodiments provide a comprehensive diagnosis tool for the alignment operation of vehicle wheels by contactless scanning, in particular a real time measuring for total wheel alignment, and enable a respective hassle-free adjustment operation.

33 Claims, 3 Drawing Sheets

APPARATUS FOR CONTACTLESS 3D WHEEL ALIGNMENT, SYSTEM AND METHOD THEREFOR

FIELD OF THE INVENTION

The invention concerns an alignment measurement apparatus for contactless measuring alignment of a vehicle wheel, an alignment measuring system and an alignment measurement method

BACKGROUND OF THE INVENTION

The present invention more specifically relates to an alignment measuring device for wheels of an automotive vehicle or the like, by which the inclination angles, in particular the toe-in angle and the camber, of a wheel mounted through the suspension of the vehicle is measured in a contactless manner, namely by non-contact distance measurement with the stationary (not rotating) wheel.

In this application, the term "wheel" should be understood to include the hub, the spokes or disk of the wheel, and the rim, in particular the flange of the rim also called bead of the rim, at which the edge forms the border between the mounted tire. A wheel can be made of an applicable material, nowadays mostly an aluminum alloy. The part of the wheel on which a tire is mounted is the rim and the edges of the rim preventing the tire from getting off the rim are the bead of the rim. The middle of the wheel, where it normally is mounted to a vehicle's axis is the hub of the wheel. The portion between the hub and the rim can be spokes of or the disk of the wheel; the area where a spoke merges the rim is the spoke's base. In this context an automotive vehicle may be generally motor driven vehicle, a motorcycle, a car, a truck, or even an airplane the landing gear of which also having wheels. In other words, any kind of object with turning wheels, the wheels of which may be subject to the method or apparatus of the present application. The tire mounted to the wheel is sometimes also considered as part of the wheel, but for the purpose of adjusting the alignment of the wheels on the automotive vehicle or the like, the measurement of the alignment of the wheel itself is more reliable, since a tire may have irregularities.

According to the general aspect, correct alignment of the wheels of automotive vehicles requires measurement of the respective inclination angles indicating the mounting respective position of the wheels with respect to each other and the automotive vehicle. In this context, toe-in angle is the inclination angle of the wheel or the tire surface with respect to the direction of progress of the vehicle, the camber angle is the degree of inclination of the wheel or the tire surface with respect to the vertical plane, and the caster is the angle between the vertical at the wheel center and the inclination of the king pin shaft as viewed directly sideways from the wheel. Accurate measurement and an correct adjustment of the wheel alignment including all of these angles is the important factor for improving the driving characteristics of the respective vehicle, in particular with respect to the tire wear.

The toe-in angle indicates whether the tires are wider apart at the front or at the back as viewed from above the vehicle body and concerns both the front and rear wheels. If wheels are wider apart at the front, this is called toe-out, and if the wheels are wider apart at the rear, this is called toe-in. The camber angle indicates whether the wheel is wider apart at the top or at the bottom as viewed from the direct front or rear of the vehicle, and represents the angle formed by the normal to the ground contact point of the tire and a straight line along the tire. When the tire is perpendicular to the ground, the camber is zero; when the tire is inclined inward, the camber is negative; and the tire inclined outward is positive in camber. The camber angle is measured for the purpose of facilitating the steering operation, reducing the vertical load and preventing the wheel from becoming wider apart at the bottom. A positive caster is involved if the king pin shaft is inclined rearward, a negative caster is involved if the king pin shaft is inclined forward, and a zero caster is involved if the king pin shaft is in a vertical position. The caster is required for maintaining the straight-line stability.

DESCRIPTION OF THE RELATED ART

U.S. Pat. No. 6,657,711 discloses an apparatus for measuring the dynamic characteristics of a vehicle wheel alignment in non-contact fashion. A laser light source emits a laser beam of a predetermined geometric pattern toward the wheel side surface. A laser beam control device controls the width of the laser beam in such a manner as to be radiated only in a predetermined range of the wheel side surface, in particular two laser light sources are used which emit non-parallel laser beams. A photo detecting device receives the geometric pattern on the wheel side surface of the two laser beams and converts it into corresponding two image data. A processing unit calculates the distance between the two images based on the two image data and calculates the wheel alignment based on the same distance.

However, the non-contact measuring apparatus of the prior art is very complex and requires lots of electronic and opto-mechanic movable parts, alike optical means for producing laser beams with a certain geometrical pattern, respective means for control of the laser beam, and devices like liquid crystal shutter, silicon micro-mirror, or electromagnetic effect iris shutter. Those parts or devices are highly susceptible for damage and/or wrong adjustment due to the rough environment of an automotive garage or shop. Further, the prior art apparatus requires rotation of the wheels that is not only a further technical requirement but also causes special measures for accident prevention.

SUMMARY OF THE INVENTION

It is one object of the invention is to provide a method and an apparatus of the kind set forth in the opening part of this specification, with which the alignment of the automotive vehicle wheel can be determined in a simpler manner.

It is another object to provide an alignment measuring apparatus which is able to handle a variety of different automotive vehicle wheels with respect to design and size, to measure and adjust the wheel alignment with high accuracy.

It is yet another option to provide an apparatus which is free of maintenance for a long period of time, which requires to be mechanical robust and simple in order fit in the rough environment of an automotive garage or shop.

According to a first embodiment, an alignment measurement apparatus for contactless measuring alignment of a vehicle wheel comprises a support at which a carrier is rotatable mounted about a rotation point; at least one measuring unit mounted to the carrier such that the measuring unit has a defined geometrical position and is configured to measure distance data of a measurement point on the wheel from the respective measurement unit in a contactless manner, wherein the measuring unit being pivotable about an axis, parallel to a reference plane corresponding to a rotation plane of the carrier device about the mounting point and orthogonal to an radius from the rotation point to the measuring unit; control means configured to control rotation of the carrier device and pivoting of the at least one measuring unit such that a measurement point is on the wheel in the area of the bead of the rim; and processing means configured to calculate wheel alignment data from the provided measured distance data of at least three measurement points together with the respective geometrical position and a respective pivoting angle of the respective at least one measurement unit, and a respective rotation angle of the carrier.

In a specific embodiment the apparatus comprise a controllable carrier pivoting means at the support to which the carrier is operable mounted. The pivoting means are arranged such that the respective pivoting angle can directly be determined from a controlled pivoting of the carrier. For instance, the carrier pivoting means can be a step motor having at least one predetermined pivoting position as a reference position for the respective pivoting angle. The reference position can be a home position of the step motor which can be sensed by means of a micro switch or alike. Alternatively, the carrier pivoting means can be a motor which is provided with a pivoting sensor means that is configured to measure an actual pivoting angle of the carrier. Such a pivoting sensor may be incorporated in the motor or can be a separate component at the motor or carrier.

According to a second embodiment, an apparatus for contactless measuring alignment of a vehicle wheel, the apparatus comprises at least three measuring units arranged on a carrier such that their geometrical positions define a reference plane, each measuring unit being configured to measure distance data of a respective measurement point on the wheel from the respective measurement unit in a contactless manner; a support at which the carrier is mounted at a mounting point, wherein each measuring unit is pivotable about an respective axis, being parallel to the reference plane and orthogonal to an radius from a geometrical center of the geometrical positions of the at least three measuring units; and control means configured to control pivoting of each measuring unit such that a respective measurement point on the wheel is in the area of the bead of the rim; and processing means configured to calculate wheel alignment data from the provided measured distance data of the at least three measurement points together with the respective geometrical position and a respective pivoting angle of the respective measurement unit.

In one embodiment the apparatus comprises three measuring units, which are arranged to each other with respect to a reference point in the reference plane such that respective two adjacent measuring units are spaced by an angle of 120 degree.

The measuring unit of the apparatus according to the first or second embodiments comprise in a specific development pivoting means which are arranged such that the respective pivoting angle of the respective measuring unit can be determined. The pivoting means are preferably a step motor having at least one predetermined pivoting position as a reference position for the respective pivoting angle. However, it is also possible to use normal motors as pivoting means which are further provided with a respective pivoting sensor as explained in connection with the carrier pivoting means above.

As to the measuring unit, in the first and second embodiment, a measuring unit may comprise an optical triangulation-measuring device. Such a triangulation-measuring device is, for instance, known from EP-A2-1174698 and can be used for contactless scanning as well as distance measurement. That triangulation measuring device not only makes it possible to determine by the scanning functionality the profile of the wheel, in particular it is possible to determine a desired position on vehicle wheel, as the position of the bead or flange of the rim. For instance, when the alignment operation starts, the measuring unit begins pivoting and simultaneously scanning the wheel to provide for data that allows for identification of the rim edge as location for an optimal measurement point for the alignment measuring. As soon as a measuring unit points to the portion of the rim close to the edge that can be hit from the respective point of view, the unit continuously measures the distance between the respective measuring unit and the belonging measurement point. Hence, during the alignment operation the respective actual alignment data of the automotive vehicle wheel can permanently be updated. Further, it is also possible to perform periodically quick rim scans to enable maintaining of the optimal measurement point on the bead of the rim.

The control means are configured to control the pivoting of the at least one measuring unit such that measurement data provided by the measuring unit during pivoting can be evaluated by the processing means for detecting the measuring points on the surface of rim of the wheel, which are preferably at the bead of the rim, as explained above. Further, the control means are configured to perform the continuous adjustment of the pivoting of a measuring unit (the quick rim scans) such that the respective measuring point on the surface of rim of the wheel at the bead of the rim is maintained.

The support of the apparatus is a stand and the carrier is mounted to the stand such that the reference plane is substantial orthogonal to a footprint of the stand. In other words, the reference plain is generally under normal conditions of use substantially parallel orientated to the disk or spokes of the wheel mounted on an automotive vehicle in normal sitting position.

In a further development, the apparatus further comprises at least two additional optical angle-measuring units configured to track a relative orientation of the apparatus to at least one another adjacent apparatus. Thereby it is possible to have a number of respective apparatuses—corresponding to the number of wheels of the vehicle—to set up an alignment measurement system able to measure total alignment of the wheels of the vehicle. Accordingly, the alignment apparatus of the invention can advantageously be used to build up an alignment measurement system for contactless total alignment of all wheels of an automotive vehicle.

In one embodiment of the system the alignment apparatuses are movable mounted to a lift for lifting an automotive vehicle, the wheels the alignment of which to be adjusted. The alignment apparatuses may be movable mounted on the sides of the lift such that the position is adjustable to the position of the wheels of a vehicle sitting on the lift.

In another embodiment of the system each alignment measurement apparatus further comprises the at least two additional angle measuring units configured to track relative orientation of the respective apparatus with respect to two different other adjacent apparatuses of the system. The angle measuring units may be of any suitable type, for instance, of the optical type alike a CCD-angle measuring device.

In the system the alignment apparatuses of the system are connected to a central processing device configured to calculate the respective inclination angles of each wheel required for a total wheel alignment with respect to predetermined reference angles. For that purpose, the alignment apparatuses may be interconnected with a central processing device via a radio or cable connection or alike. Due to the continuous measuring of the respective wheel alignment measuring apparatuses of the system a total wheel alignment of all wheels of an automotive vehicle can be performed in the contactless manner, which avoids the hassle of conventional systems of the contact type, but also is less affected to mechanical wear and destruction.

With respect to the method of determining alignment of a motor vehicle wheel, the method comprises basically the steps of controlling a contactless measuring device to detect at least three different measurement points on the bead of the rim of the wheel and to measure respectively a distance and an angle from the measuring device to the respective measurement point; and calculating alignment of the vehicle wheel from the distances and angles of the at least three different measurement points.

The controlling of the contactless measuring device may further comprise continuous measuring the distance of a measurement point on rim of the wheel to provide real time alignment data during the alignment operation.

The controlling of the contactless measuring device may further comprise a step of periodically performing quick rim scans between the continuous measuring the distance of a measurement point on rim of the wheel to maintain the location of on the bead of the rim of the wheel.

Also a total wheel alignment with respect to predetermined reference angles can be achieved by calculation of respective inclination angles of each wheel with reference to each other. Accordingly, for the real time adjustment and measurement of the total wheel aliment system the method further comprises contactless tracking of a relative orientation of alignment of all wheels of the vehicle with respect to each other; and calculating a total wheel alignment of all wheels of the vehicle.

BRIEF DESCRIPTION OF THE DRAWINGS

Other objects and features will become apparent from the following detailed description considered in conjunction with the accompanying drawings. It is to be understood, however, that the drawings are designed solely for purposes of illustration and not as a definition of the limits of the invention, for which reference should be made to the appended claims only. It should be further understood that the drawings are merely intended to conceptually illustrate the structures and procedures described herein.

DESCRIPTION OF THE EMBODIMENTS

Figure 1:
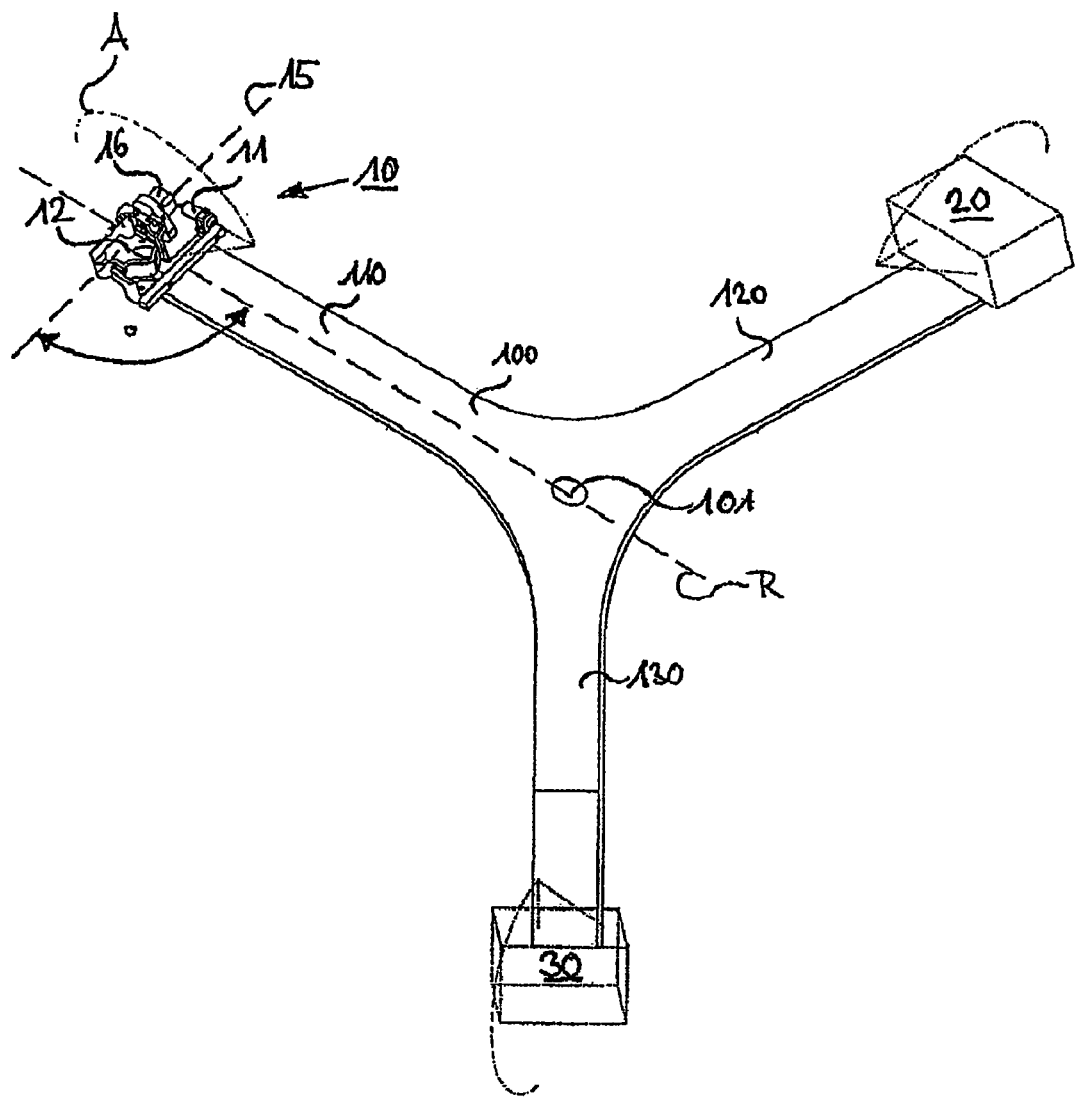
FIG. 1 shows a carrier structure of a wheel alignment measuring apparatus with three measurement units according to a preferred embodiment.

The invention will now be explained in detail below with reference to the drawings. In all the drawings, the same reference numerals designate the same or corresponding component parts, respectively. The dimensions, material, shape or the relative positions of the component parts described in the embodiments, however, are only illustrative but not intended for limiting the scope of invention unless otherwise specified.

FIG. 1 illustrates a carrier structure 100 of a wheel alignment measuring apparatus with three measurement units 10, 20, 30 according to a preferred embodiment. Each measurement unit 10, 20, 30 has respective scanning devices and distance measuring devices that are combined to form the respective measurement units 10, 20, 30, which are mounted on the carrier structure 100. The measurement unit 10 is depicted in more detail and is described below, whilst the other two measurement units 20, 30 are merely sketched as dashed boxes.

As can be seen the carrier structure 100 is shaped such that there are three arms 110, 120, 130 which are connect to each other at a common centre 101 of the carrier 100. At each end of each respective arm 110, 120, 130 one of the measurement units 10, 20, 30 is located. All embodiment of the invention involve the use of at least one optical measurement unit.

Accordingly, measurement unit 10 comprises a scanning device 11 producing a scanning light beam, for example a laser beam. For measurement of wheel alignment, the laser beam can be directed by pivoting of the unit 10 on to a measurement point located on the surface of a wheel. A measurement point is preferably located on the bead or flange of the rim of the wheel. Further the measurement unit 10 comprises a distance measurement device 12 for receiving reflected light from the respective measurement point that originates from the reflected laser beam. The distance measurement device 12 produces a respective measurement signal that is proportional to the distance of the measurement point to the predetermined and known location of the respective measurement unit 10 as reference location.

Now the measurement unit 10 is described with reference to FIG. 1, where the unit 10 is shown in more detail, together with FIG. 2, which depicts a sectional view from above with a wheel 200 and the measuring unit 10, in particular illustrating—by means of the dashed arrow A—the pivoting operation of the measurement unit 10 for scanning and detecting the optimal measurement point 212 on the bead 210 of the wheel 200. The is unit 10 comprises the combined scanning device 11 and distance measuring device 12, which form a triangulation measuring device as, for instance, known from EP-A2-1174698. The triangulation-measuring device has the scanning device 11, which is in the form of a light source and a CCD-sensor as the spacing-measuring device 12. During operation, a laser beam emitted, which may be in pulse-mode, from the scanning device 11 will be reflected from a respective scanned measurement point on the wheel. The reflected laser light is focused by way of a receiving optical means on to a given position on a CCD-sensor inside the distance-measuring device 12. The CCD-sensor can be configured to detect separately from each other a plurality of local maxima of an illumination intensity function. The direction of the laser beam reflected from a measurement point depends on the distance of the measurement point relative to the scanning device 11. The reflected beam therefore goes by way of the receiving optical means onto a given position on the CCD-sensor that produces a distance-dependent measurement signal resulting therefrom. In other words, the respectively reflected light is received by the distance measurement device 12 and converted into a corresponding distance measurement signal. This signal is provided for further processing to the processing means, an electronic evaluation system or alike.

For the detection of an optimal measurement point on the wheel 200 the measurement unit 10 is pivotable mounted about a pivot axis 15. The pivoting is performed by a step-motor 16, which is controlled by the control unit of the apparatus. In the non-operational position of the measurement unit 10, a start-pivoting-angle or zero-pivoting-angle is sensed and determined by means of a micro switch. Due to the use of defined stepping control signals to steer or control the step-motor 16, the respective pivoting angle of the measuring unit 10 is directly known in advance from the stepping control signal.

The pivot axis 15 is parallel to the reference plane defined by the positions of the three measurement units 10, 20, 30, as can be seen from FIG. 1. The carrier structure 100 lies substantially in the reference plane. Further, the pivot axis 15 is orthogonal to a radius R drawn from the center 101 of the carrier structure 100 to the location of the measurement unit 10. In non-operation arrangement the scanning device 11 of measurement unit 10 points towards the center 101 of the carrier structure 100; this corresponds to the situation in FIGS. 1 and 2.

Figure 2:
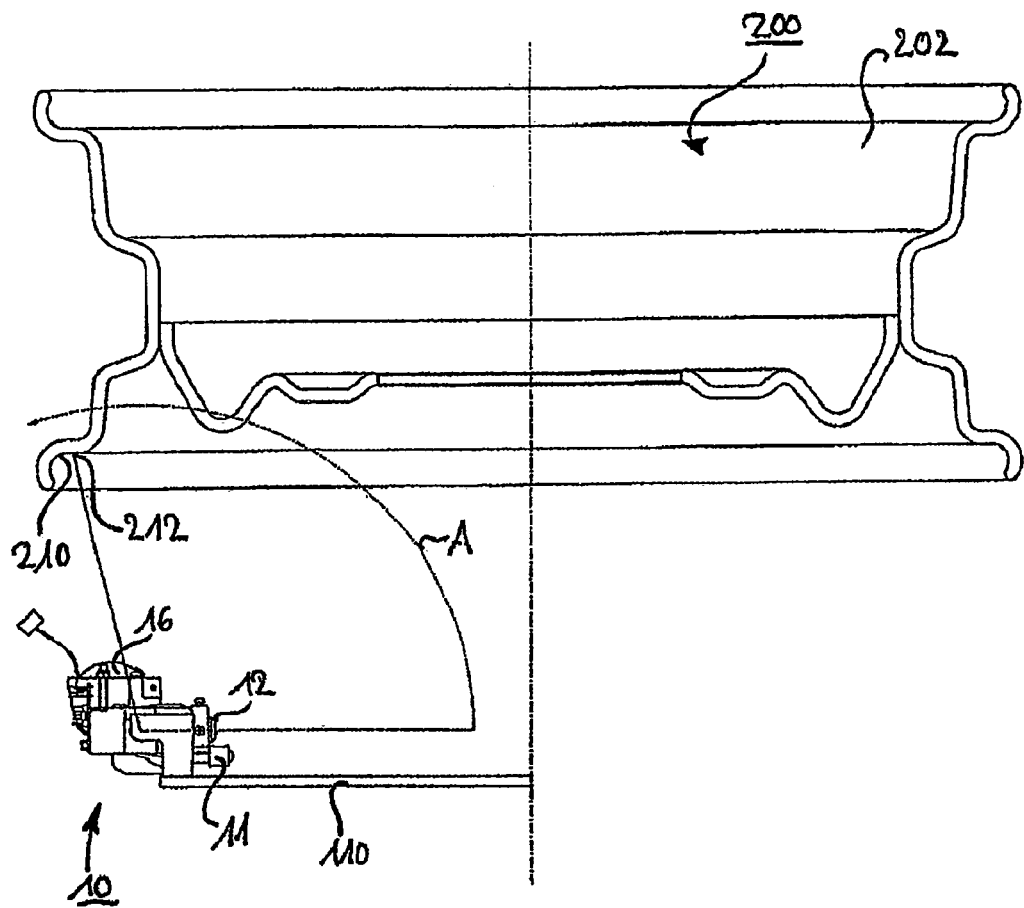
FIG. 2 depicts a sectional view from above with a wheel and one distance-measuring unit of the invention, illustrating the pivoting range of the measurement unit for scanning and detecting an optimal measurement point on the bead of the wheel.

Now with reference to FIG. 2, when a scanning and measuring operation is started the measuring unit 10 is controlled to pivot continuously about its pivot axis 15 until the laser beam of the scanning devices 12 hits an optimal measurement point 201 on the wheel. It is noted that the respective position of the measurement unit is called herein the measuring position in contrast to the measurement point on the wheel.

In case, that the apparatus includes a rotatable carrier structure, a respective rotary angle is also determined for each measuring position of the one or more measurement units by means of a rotary angle sensor (not shown). Further, each measurement unit (10, 20, 30 in FIG. 1, and 10 in FIG. 2) comprises a pivot angel sensor for determining the respective pivoting angle of the respective measurement unit about the respective pivot axis.

The rotary angle sensor, the at least one distance measurement unit together with the respective pivot angle sensor are electrically connected to the electronic evaluation system, which may be a computer, a micro-controller or minicomputer (not shown). The computer computes based on the distance measurement values together with the respective associated pivot angle values and, if the case, the respective associated rotary angle value in respect of the respective measurement points from the location of the measurement points disposed on the surface of the bead of the wheel a plane the orientation of which represents the actual alignment of the wheel.

Accordingly, the toe-in angles and the camber angles can be computed by a well-known mathematics based on the positions of at least three representative measurement points. In case, more than three measurement points on the surface of the wheel are available, for instance due to the fact that more than three measurement units are used or that the rotatable carrier structure is used, the redundant number of distance and angle measurements allow more accurate determination of the wheel alignment, for example by reducing the system error by respective statistical methods as least square fitting or alike. In particular, the apparatus with more than three units would be more robust, allowing for consistent alignment readings even when one of the scanner devices or receiver devices is occluded. Hence, the overall system would be more accurate as well as more robust. On the other hand, the embodiment of the apparatus with the rotatable carrier structure would allow to have only one measurement unit which makes the whole system cheaper and thus for shops, in which the apparatus is seldom in use the system, can be offered by a more competitive and reasonable price.

The position of each wheel, in particular the total wheel alignment of a vehicle can be derived from the combined alignment data of all wheels together with the relative positions of the respective alignment measurement apparatuses. For that purpose, the contactless alignment measurement apparatuses of the invention can set-up an alignment measurement system for total wheel alignment.

Figure 3:
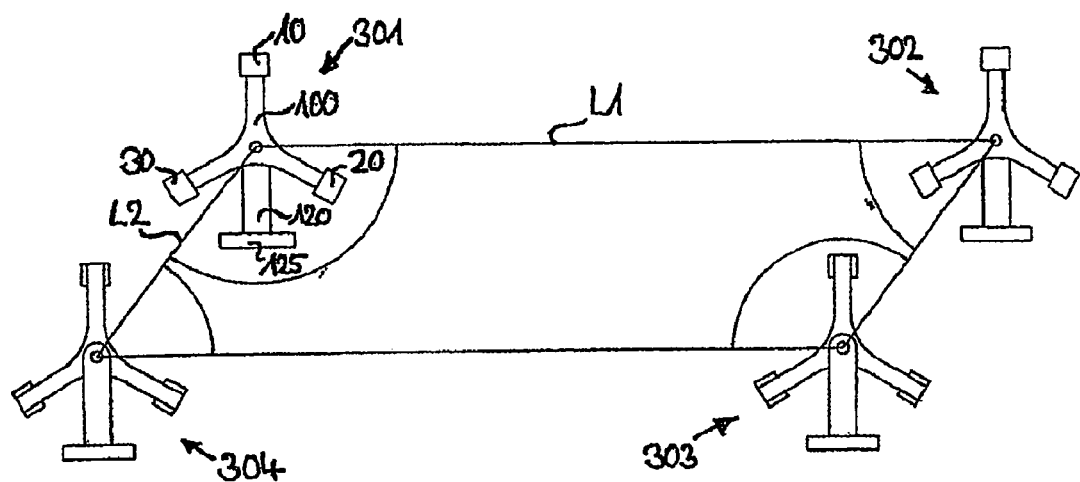
FIG. 3 is a perspective view of a wheel alignment system set-up by four wheel alignment measuring apparatuses of the invention, the arrangement of which forms an rectangular reference configuration for total wheel alignment.
Figure 4:
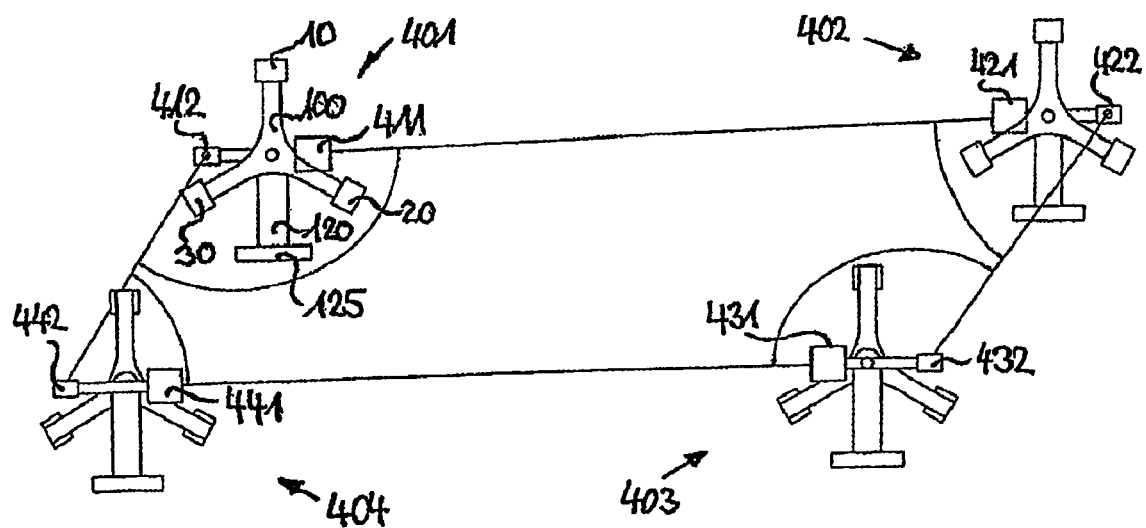
FIG. 4 is a perspective view of wheel alignment system set-up as in FIG. 3, wherein each wheel alignment measuring apparatus is further equipped with additional angle measurement devices for determining the relative location and orientation of each apparatus with respect to adjacent ones.

Now reference is made for FIG. 3, which is a simplified perspective view of a wheel alignment system set-up by means of four wheel alignment measuring apparatuses 301, 302, 304, 304 of the invention, the arrangement of which forms an rectangular reference configuration for total wheel alignment of vehicle having four wheels, and FIG. 4, which is a simplified perspective view of a wheel alignment system set-up by four wheel alignment measuring apparatuses 401, 402, 403, 404 of the invention, wherein each wheel alignment measuring apparatus is equipped with additional angle measurement devices 411, 412, 421, 422, 431, 432, 441, 442 for determining the relative location and orientation of each apparatus 401, 402, 403, 404 with respect to adjacent ones.

As can be gathered from FIGS. 3 and 4, the carrier structure 100 is connected to a stand 120 with a footprint 125 for arrangement. For sake of clearness only the apparatus in the left upper corner of FIGS. 3 and 4 has the general reference signs for the measurement units 10, 20, 30, the carrier 100, the stand 120, and the footprint 125.

In FIG. 3 the apparatuses 301, 302, 304, 304 are arranged in a well-defined orientation to each other, preferably such that virtual connection lines between adjacent apparatuses, e.g., the line L1 between apparatuses 301 and 302 and the line L2 between apparatuses 301 and 304, are orthogonal to each other. In other words, the measuring apparatuses 301, 302, 304, 304 are arranged in rectangular configuration. Such configuration may be achieved, where the apparatuses 301, 302, 304, 304 are mounted to the sides of a lift (not shown) for an automotive vehicle (not shown). Further, in such a case, if all or at least one pair (e.g., apparatus 302, 303) of the apparatuses can be made moveable for adjusting the distance between the two pairs such that to match the spacing between the front and rear axis of a automotive vehicle put on the lift for total wheel alignment.

In FIG. 4 the four wheel alignment measuring apparatuses 401, 402, 403, 404 are each provided with the additional angle measurement devices 411, 412, 421, 422, 431, 432, 441, 442, which enables the computer controlling the system to determine the relative positioning and orientation of each apparatus 401, 402, 403, 404 with respect to adjacent ones, e.g., by the angle measurement devices 411 of apparatus 401 the position and orientation with respect to apparatus 402 can be determined and by the angle measurement devices 412 of apparatus 401 the position and orientation with respect to apparatus 404 can be determined. Hence, whilst this system is little bit more complex, but it provides more flexibility, in particular for automotive shops where the alignment system is not permanently required to be set-up.

The present invention provides an alignment measuring apparatus for 3D contactless measuring alignment of a wheel of an automotive vehicle, a system formed by several apparatuses for a total wheel alignment of all wheels of an automotive vehicle, and a respective method for carrying out 3d contactless wheel alignment in real time. The several embodiments provide a comprehensive diagnosis tool for the alignment operation of vehicle wheels by contactless scanning, in particular a real time measuring for total wheel alignment, and enable a respective hassle-free adjustment operation.

While there have been shown and described and pointed out fundamental features of the invention as applied to the embodiments thereof, it will be understood that various omissions and substitutions and changes in the form and details of the apparatus and method described may be made by those skilled in the art without departing from the present invention. For example, it is expressly intended that all combinations of those elements and/or method steps, which perform substantially the same function in substantially the same way to achieve the same results, be within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of designed choice. It is the intention, therefore, to be limited only as indicated by the scope of the claims appended hereto.

The embodiments of an apparatus for performing one of the methods described herein may include or be utilized with any appropriate voltage or current source, such as a battery, an alternator, a fuel cell, and the like, providing any appropriate current and/or voltage, such as about 12 Volts, about 42 Volts and the like.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An alignment measurement apparatus for contactless measuring alignment of a vehicle wheel, the apparatus comprising:
   a support at which a carrier is rotatable mounted about a rotation point;
   at least one measuring unit mounted to the carrier such that the measuring unit has a defined geometrical position and configured to measure distance data of a measurement point on the wheel from the respective measurement unit in a contactless manner, wherein the measuring unit being pivotable about an axis, parallel to a reference plane corresponding to a rotation plane of the carrier device about the mounting point and orthogonal to an radius from the rotation point to the measuring unit;
   control means configured to control rotation of the carrier device and pivoting of the at least one measuring unit such that a measurement point is on the wheel in the area of the bead of the rim; and
   processing means configured to calculate wheel alignment data from the provided measured distance data of at least three measurement points together with the respective geometrical position and a respective pivoting angle of the respective at least one measurement unit, and a respective rotation angle of the carrier.

2. Apparatus according to claim 1, wherein the apparatus comprises a controllable carrier pivoting means at the support to which the carrier is operable mounted, the pivoting means being arranged such that the respective pivoting angle can directly be determined from a controlled pivoting of the carrier.

3. Apparatus according to claim 2, wherein the carrier pivoting means is a step motor having at least one predetermined pivoting position as a reference position for the respective pivoting angle.

4. Apparatus according to claim 2, wherein the carrier pivoting means is a motor provided with a pivoting sensor means configured to measure an actual pivoting angle of the carrier.

5. Apparatus according to claim 1, wherein the measuring unit comprises an optical triangulation measuring device.

6. Apparatus according to claim 1, wherein the measuring unit comprises pivoting means arranged for determining the respective pivoting angle.

7. Apparatus according to claim 1, wherein the apparatus comprises three measuring units, which are arranged to each other with respect to a reference point in the reference plane such that respective two adjacent measuring units are spaced by an angle of 120 degree.

8. Apparatus according to claim 1, wherein the control means are configured to control pivoting of the at least one measuring unit such that measurement data produced by the measuring unit during pivoting is evaluated by the processing means for detecting measuring points on the surface of rim of the wheel corresponding to the bead of the rim.

9. Apparatus according to claim 1, wherein the support is a stand and the carrier is mounted to the stand such that the reference plane is substantial orthogonal to a footprint of the stand.

10. Apparatus according to claim 1, wherein the control means are configured to continuously adjust the pivoting of a measuring unit such that the respective measuring point on the surface of rim of the wheel at the bead of the rim is maintained.

11. Apparatus according to claim 1, wherein the apparatus further comprises at least two additional optical angle-measuring units configured to track a relative orientation of the apparatus with respect to at least one another adjacent apparatus.

12. An apparatus for contactless measuring alignment of a vehicle wheel, the apparatus comprising:
   at least three measuring units arranged on a carrier such that their geometrical positions define a reference plane, each measuring unit being configured to measure distance data of a respective measurement point on the wheel from the respective measurement unit in a contactless manner;
   a support at which the carrier is mounted at a mounting point, wherein each measuring unit is pivotable about an respective axis, being parallel to the reference plane and orthogonal to an radius from a geometrical center of the geometrical positions of the at least three measuring units; and
   control means configured to control pivoting of each measuring unit such that a respective measurement point on the wheel is in the area of the bead of the rim; and
   processing means configured to calculate wheel alignment data from the provided measured distance data of the at least three measurement points together with the respective geometrical position and a respective pivoting angle of the respective measurement unit.

13. Apparatus according to claim 12, wherein the pivoting means is a step motor having at least one predetermined pivoting position as a reference position for the respective pivoting angle.

14. Apparatus according to claim 12, wherein the measuring unit comprises an optical triangulation measuring device.

15. Apparatus according to claim 12, wherein the measuring unit comprises pivoting means arranged for determining the respective pivoting angle.

16. Apparatus according to claim 12, wherein the apparatus comprises three measuring units, which are arranged to each other with respect to a reference point in the reference plane such that respective two adjacent measuring units are spaced by an angle of 120 degree.

17. Apparatus according to claim 12, wherein the control means are configured to control pivoting of the at least one measuring unit such that measurement data produced by the measuring unit during pivoting is evaluated by the processing means for detecting measuring points on the surface of rim of the wheel corresponding to the bead of the rim.

18. Apparatus according to claim 12, wherein the support is a stand and the carrier is mounted to the stand such that the reference plane is substantial orthogonal to a footprint of the stand.

19. Apparatus according to claim 12, wherein the control means are configured to continuously adjust the pivoting of a measuring unit such that the respective measuring point on the surface of rim of the wheel at the bead of the rim is maintained.

20. Apparatus according to claim 12, wherein the apparatus further comprises at least two additional optical angle-measuring units configured to track a relative orientation of the apparatus with respect to at least one another adjacent apparatus.

21. An alignment measurement system for contactless alignment of wheel of an automotive vehicle, the system comprising at least four alignment apparatuses according to claim 1.

22. System according to claim 21, wherein the alignment apparatuses are movable mounted to a lift for lifting a automotive vehicle the wheels the alignment of which to be adjusted, wherein the alignment apparatuses are movable mounted on the sides of the lift such that the position is adjustable to the position of the wheels of a vehicle on the lift.

23. System according to claim 21, wherein the alignment apparatuses of the system are connected to a central processing device configured to calculate respective optical angle angles of each wheel required for a total wheel alignment with respect to predetermined reference angles.

24. System according to claim 21, wherein each alignment measurement apparatus further comprises at least two additional angle measuring units configured to track a relative orientation of the respective apparatus with respect to another apparatus of the system.

25. An alignment measurement system for contactless alignment of wheel of an automotive vehicle, the system comprising at least four alignment apparatuses according to claim 12.

26. System according to claim 25, wherein the alignment apparatuses are movable mounted to a lift for lifting a automotive vehicle the wheels the alignment of which to be adjusted, wherein the alignment apparatuses are movable mounted on the sides of the lift such that the position is adjustable to the position of the wheels of a vehicle on the lift.

27. System according to claim 25, wherein the alignment apparatuses of the system are connected to a central processing device configured to calculate respective optical angle angles of each wheel required for a total wheel alignment with respect to predetermined reference angles.

28. System according to claim 25, wherein each alignment measurement apparatus further comprises at least two additional angle measuring units configured to track a relative orientation of the respective apparatus with respect to another apparatus of the system.

29. An alignment measurement method of determining alignment of a motor vehicle wheel, the method comprising the steps of:
controlling a contactless measuring device to detect at least three different measurement points on the bead of the rim of the wheel and to measure respectively a distance and an angle from the measuring device to the respective measurement point; and
calculating alignment of the vehicle wheel using the distances and angles of the at least three different measurement points.

30. Method according to claim 29, wherein the controlling of the contactless measuring device comprises continuous measuring of a distance of a measurement point on the rim of the wheel to provide real time alignment data during the alignment operation.

31. Method according to claim 29, wherein the controlling of the contactless measuring device further comprises a step of periodically performing quick rim scans in-between continuous measuring of the distance of the measurement point such that the location of the measurement point on the bead of the rim of the wheel is maintained.

32. Method according to claim 29, wherein the calculating step comprises calculation of respective inclination angles of each wheel required for a total wheel alignment with respect to predetermined reference angles.

33. Method according to claim 29, comprising contactless tracking of a relative orientation of alignment of all wheels of the vehicle with respect to each other; and calculating a total wheel alignment of all wheels of the vehicle.

* * * * *